July 21, 1953  E. H. SCHLEIF  2,645,946
VARIABLE-SPEED PULLEY ASSEMBLY
Filed Oct. 18, 1951  2 Sheets-Sheet 1

Edwin Henry Schleif
INVENTOR.

July 21, 1953  E. H. SCHLEIF  2,645,946
VARIABLE-SPEED PULLEY ASSEMBLY
Filed Oct. 18, 1951  2 Sheets-Sheet 2
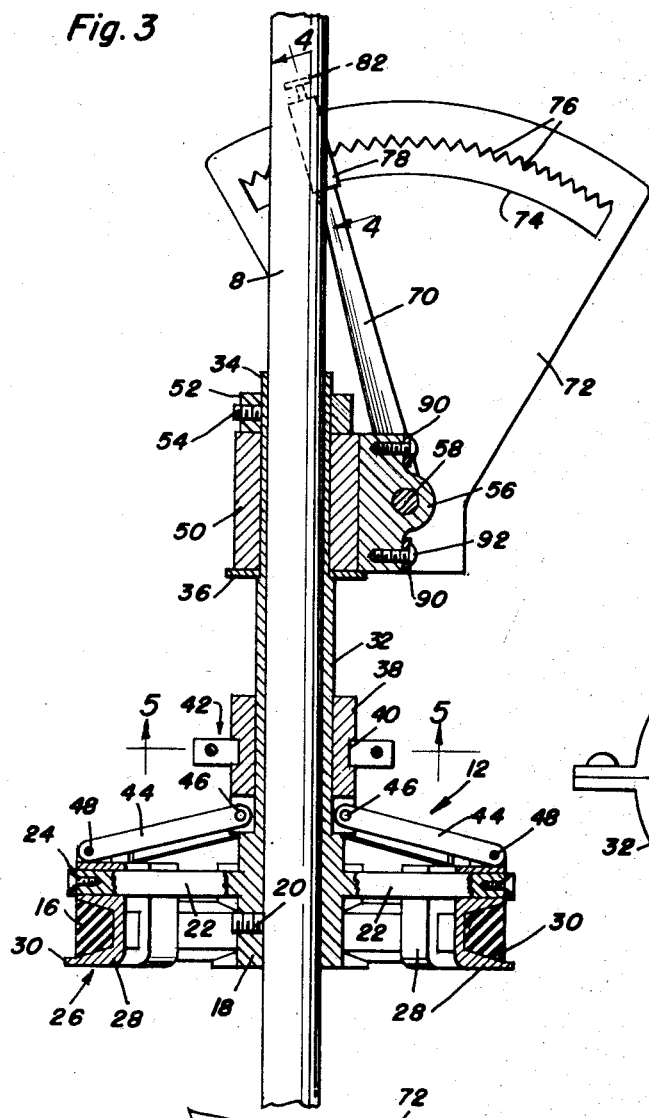
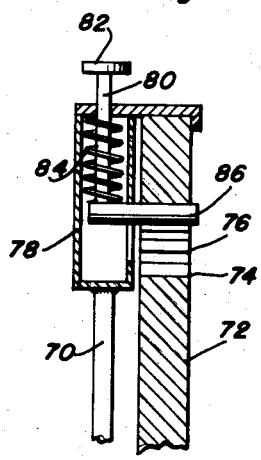
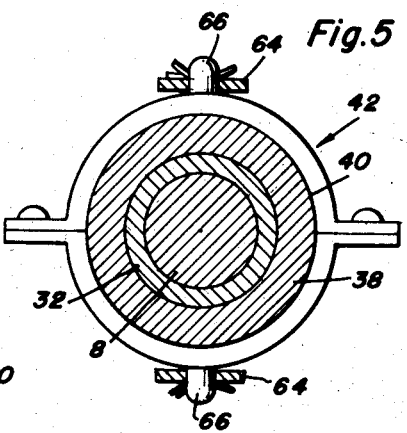
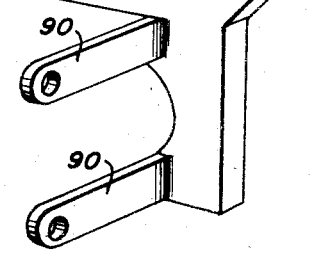
Edwin Henry Schleif
INVENTOR.

Patented July 21, 1953

2,645,946

UNITED STATES PATENT OFFICE 2,645,946

VARIABLE-SPEED PULLEY ASSEMBLY

Edwin Henry Schleif, Inwood, N. Y.

Application October 18, 1951, Serial No. 251,871

2 Claims. (Cl. 74—230.2)

The present invention relates to certain new and useful improvements in a variable speed pulley assembly which is especially, but not necessarily, adapted for use on a small drill press and has more particular reference to a construction in this category which is susceptible of being made so that it may be installed for practical use on existing drill press parts without, in any manner, interfering with the drill press proper or motor, inasmuch as the over-all assemblage takes the form of a self-contained structure.

Used on the stated drill press, the structure has desirable advantages in that it makes for instant changes in speeds without stopping the motor, without overstretching the motion transmission belt and serving to promote valuable saving of time and labor.

Briefly construed, this improved assembly is characterized chiefly by two variable speed pulleys which are exactly alike, one pulley being mounted on the spindle of the drill press and the other pulley mounted on the motor driven shaft, said pulleys having especially constructed expansible and contractible rim means for the endless belt and manually regulable control means being provided whereby to permit the diameter of one pulley to be decreased while the diameter of the complemental pulley is increased and vice versa, all with a view toward providing a simple and reliable ways and means to regulate the shafts relative to one another according to the requirements met.

Another object of the invention is to provide, as a component of the complete assemblage, an especially constructed expansible and contractible pulley which is characterized by a hub, radial spokes attached at their inner ends to said hub and radiating therefrom, a felly band or ring encircling and secured to the respective outer ends of the spokes, especially constructed grooved belt accommodating blocks which are slidable in and out on the spokes and remote controlled push-pull arms operatively connected at their respective outer ends to said blocks to properly operate the same in requisite unison.

Another object has to do with the stated pulley wherein the hub has an integral tubular sleeve extending axially therefrom, said sleeve encasing the coacting motion transmitting shaft, said sleeve being journaled in a relatively stationary bearing and providing a satisfactory mount for a sliding hub which serves to actuate the stated push-pull arms.

Another important phase of the over-all construction has to do with the stated bearing which serves as a support for a rock shaft, the latter having rocker arms to operate links which, in turn, move the sliding hub back and forth on the sleeve, said rock shaft being oscillated by a manually moved lever carried by the shaft and said lever coacting with a dial plate having a segmental rack to accommodate spring held detent or latch means carried by the lever.

An equally important object of the invention is to structurally, functionally and otherwise improve upon similarly constructed prior art variable speed control devices and, in so doing, to provide a construction which satisfactorily lends itself to use in association with wood lathes, grinding, polishing, sanding and surfacing heads and other equivalent devices and machines.

Other objects and advantages will become more readily apparent from the following description and accompanying sheet of illustrative drawings.

In the accompanying sheet of drawings, wherein like numerals are employed to designate like parts throughout the views:

Figure 3 is an enlarged view in section and elevation which is taken approximately on the plane of the vertical line 3—3 of Figure 2, looking the direction of the arrows;

Figure 4 is an enlarged fragmentary sectional and elevational view of the so-called dial plate, lever and adjusting and retaining means for said lever, the section being on the line 4—4 of Figure 3;

Figure 5 is an exaggerated horizontal section, with parts omitted, taken on the horizontal line 5—5 of Figure 3, looking in the direction of the arrows; and Figure 6 is a fragmentary perspective view of the lower attachable end of the aforementioned dial plate.

Figure 1:
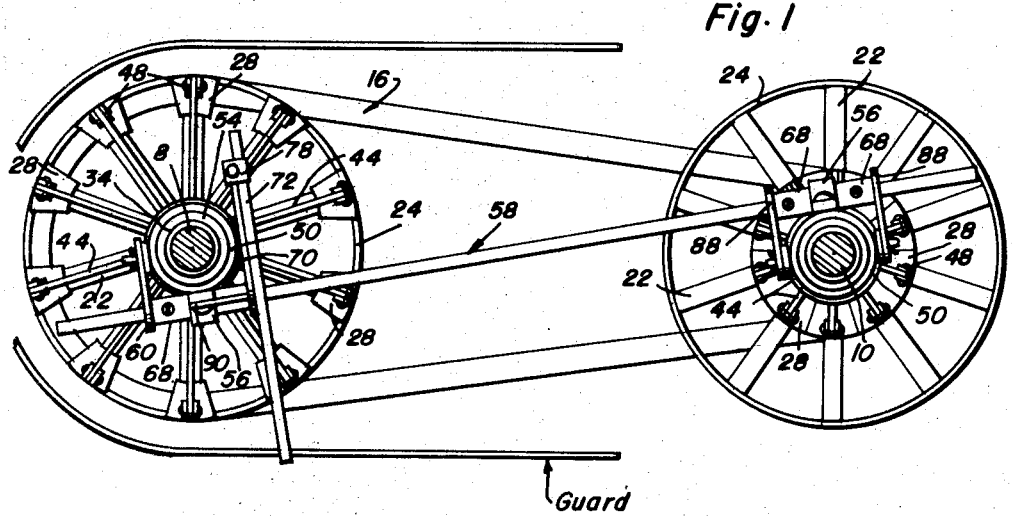
Figure 1 is a top plan view of a variable speed pulley assembly constructed in accordance with the principles of the present invention.
Figure 2:
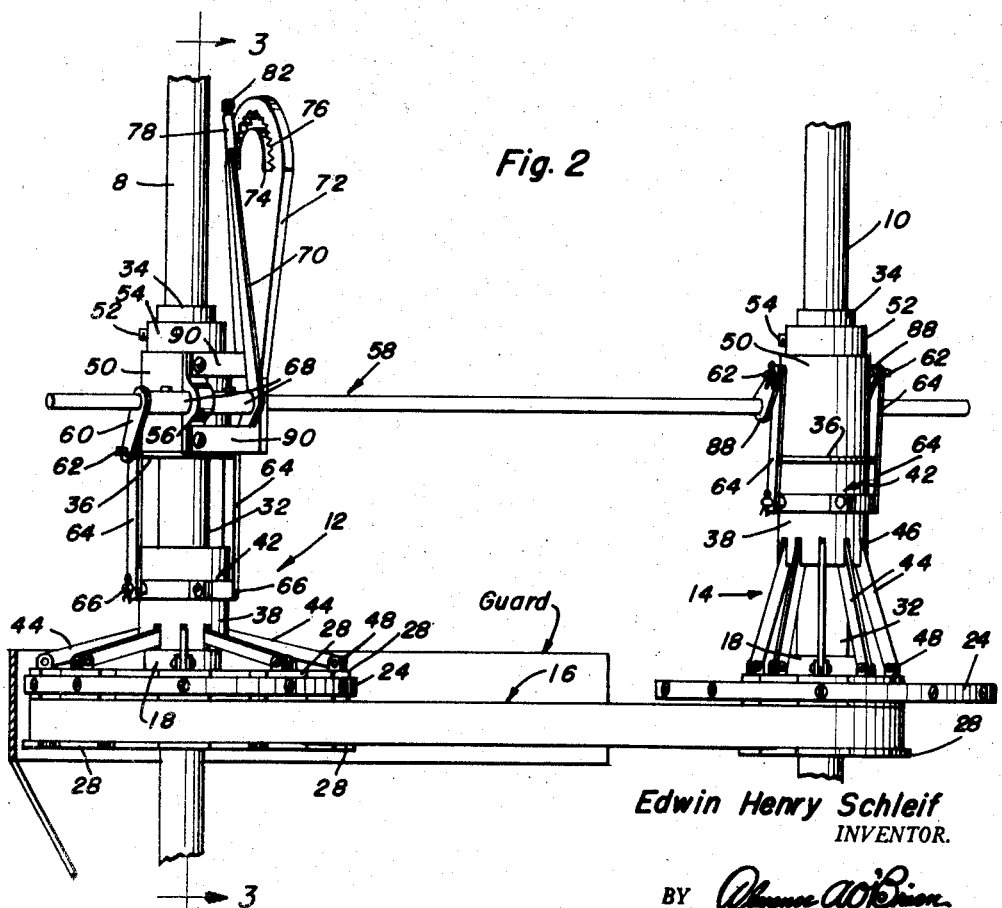
Figure 2 is a side elevational view of the same.

In Figure 2, the drive shaft, which may be the motor driven shaft of a drill press, is denoted by the numeral 8 and the spaced parallel driven shaft 10, which may be the spindle of a drill press, is denoted by the numeral 10. The pulley assembly toward the left in Figure 2 is referred to, in a general way, by the numeral 12, while that at the right is generally designated by the numeral 14. The endless belt is denoted at 16, this being driven by the respective pulleys acting in conjunction with each other in an obvious manner.

Since each pulley construction is the same, it will simplify matters to refer to corresponding elements by corresponding numerals and lead lines. To this end, and referring then to Figure 3, the pulley head or pulley proper comprises a central hub 18 which is keyed, as at 20, to the shaft 8. As previously mentioned, this hub is provided with radial spokes 22 and an annular band or ring which serves as a stop felly, is denoted by the numeral 24 and this is screwed or otherwise fastened on the respective outer ends of the circumferentially spaced equidistant spokes. Thus, the head of the pulley is in the nature of a wheel. The latter is provided with expansible and contractible rim means denoted generally at 26. The stated means 26 comprises a plurality of suitably spaced blocks 28 each slidably mounted on its respective spoke. Each block is formed with an outwardly facing groove 30 shaped to accommodate the belt which is seated therein. Forming a part of the hub 18 is an axially disposed sleeve 32 having a reduced end portion 34 providing a shoulder for a washer 36. Slidable on and rotatable with the sleeve, is a sliding hub 38, having groove means 40 to accommodate a sectional yoke or collar 42. Push-pull arms 44 are provided and these are pivotally connected at their inner ends, as at 46, with the hub 38. They are pivotally connected at their opposite outer ends, as at 48, with the expansible and contractible blocks or slides 26. Thus, when the push-pull arms are in the position shown in Figure 3, they move the blocks outwardly against the felly ring 24. When the arms are angled to the position shown at the right in Figure 2, they move the blocks inwardly toward the hub in an obvious fashion.

The remote control means for shifting the hub 38 comprises a relatively stationary suitably supported bearing 50 in which the reduced end of the sleeve 34 rotates. There is an assembling collar 52 provided and this is held on the sleeve by a setscrew 54. The bearing 50 rests against the washer 36. A bearing bracket 56 is suitably secured to the bearing 50 and this serves to accommodate the adjacent end portion of the rock shaft 58. Now, as best shown in Figure 2 at the left, the rock shaft is provided with spaced, lateral, fixed rocker arms 60 and these are pivotally connected, as at 62, to diametrically opposite links 64—64 which are, in turn, pivotally connected at 66—66 with the sectional yoke 42. The numerals 68 are merely spacing members, as is obvious. The controller lever is denoted at 70 and this is fixed on and extends at right angles from the rock shaft. It cooperates in spaced parallelism with the relatively stationary dial or gauge plate 72. This is a sector shaped member and, as shown in Figure 3, it is provided with an arcuate slot 74 having teeth 76 providing a segmental rack. The lever is provided with a cylinder 78 having a spring returned plunger 80 therein (see Fig. 4), said plunger having a finger-piece or button 82 and the return spring means 84 confined in the cylinder. Extending through a slot in the cylinder is a detent or latch 86 which is selectively engageable with the rack teeth in an obvious manner. It will be understood that the rock shaft 58 also controls the rocker arms at the right in Figure 2, where the parts are duplicated except that the rocker arms are in an opposite direction and are, for this reason, referred to by the numerals 88. The idea is, of course, to reduce the diameter of the pulley at the right when the one at the left is expanded and vice versa and to, in this manner, have complete control of the relative rotational speed of the drive and driven shafts 8 and 10. For convenience of mounting, the plate 72 is provided with outstanding attaching fingers 90—90 and these are fastened, as at 92, to the bearing bracket or means 56, as shown in Figure 3, as well as at the left in Figure 2.

It is believed that the underlying principles of mechanics herein revealed and described are sufficiently well known that persons skilled in the art to which the invention relates will not only understand the complete construction and arrangement of all parts but the manner in which a single regulable manually controlled lever provides remote control for a rock shaft 58 which proves the operating connection stated serves to expand and contract the novel pulley.

Minor changes in shape, size and arrangement of details coming within the field of invention claimed may be resorted to in actual practice, if desired.

Having described the invention, what is claimed as new is:

1. In a variable speed construction, a rotary drive shaft, a pulley having a hub keyed on said shaft, said hub having radially expansible and contractible rim means, said hub also having an axially aligned sleeve surrounding said shaft, a stationary bearing in which said sleeve is freely rotatable, a rock shaft journaled for angular oscillation on and at right angles to the axis of said bearing, a manually regulable adjusting lever fixed to said rock shaft, lateral rocker arms carried by said rock shaft, a rotary hub slidably mounted on said sleeve, a yoke, said rotary sliding hub being keyed for rotation in said yoke, operating links between said yoke and rocker arms, and push-pull arms pivotally connected with said rotary sliding hub and rim means respectively.

2. The structure defined in claim 1 and a flat plate fixed to said bearing, said plate having a segmental toothed rack, and detent means carried by said lever and selectively engageable with the teeth of said rack.

EDWIN HENRY SCHLEIF.

References Cited in the file of this patent

UNITED STATES PATENTS

| Number | Name | Date |
|---|---|---|
| 360,920 | Scott | Apr. 12, 1887 |
| 395,258 | Autenrieth | Dec. 25, 1888 |
| 720,758 | Tuck | Feb. 17, 1903 |
| 923,788 | Gray | June 1, 1909 |
| 1,173,787 | Dunbar | Feb. 29, 1916 |
| 1,441,006 | Levy | Jan. 2, 1923 |

FOREIGN PATENTS

| Number | Country | Date |
|---|---|---|
| 331,515 | Italy | Nov. 8, 1935 |